US008823346B2

(12) United States Patent
Walters (10) Patent No.: US 8,823,346 B2
(45) Date of Patent: Sep. 2, 2014

(54) SYSTEM AND METHOD OF FEED FORWARD FOR BOOST CONVERTERS WITH IMPROVED POWER FACTOR AND REDUCED ENERGY STORAGE

(75) Inventor: Michael M. Walters, Apex, NC (US)

(73) Assignee: Intersil Americas LLC, Milpitas, CA (US)

(*) Notice: Subject to any disclaimer, the term of this patent is extended or adjusted under 35 U.S.C. 154(b) by 219 days.

(21) Appl. No.: 13/529,484

(22) Filed: Jun. 21, 2012

(65) Prior Publication Data

US 2013/0148396 A1    Jun. 13, 2013

Related U.S. Application Data

(60) Provisional application No. 61/569,013, filed on Dec. 9, 2011.

(51) Int. Cl.
*G05F 1/00* (2006.01)
*G05F 1/565* (2006.01)

(52) U.S. Cl.
USPC ............................. 323/275; 323/266; 323/285

(58) Field of Classification Search
USPC ................. 323/266, 274, 275, 277, 283–285; 363/123–126
See application file for complete search history.

(56) References Cited

U.S. PATENT DOCUMENTS

| | | | | |
|---|---|---|---|---|
| 5,804,950 | A * | 9/1998 | Hwang et al. | 323/222 |
| 5,867,379 | A * | 2/1999 | Maksimovic et al. | 363/89 |
| 7,894,216 | B2 * | 2/2011 | Melanson | 363/21.13 |
| 2003/0227279 | A1* | 12/2003 | Feldtkeller | 323/222 |
| 2006/0261786 | A1* | 11/2006 | Tiew et al. | 323/222 |
| 2008/0197818 | A1* | 8/2008 | Feldtkeller | 323/207 |
| 2010/0225240 | A1* | 9/2010 | Shearer et al. | 315/247 |
| 2011/0031899 | A1* | 2/2011 | Chu et al. | 315/307 |

FOREIGN PATENT DOCUMENTS

| | | |
|---|---|---|
| JP | 2001320880 | 11/2001 |
| JP | 2002369503 | 12/2002 |

OTHER PUBLICATIONS

Dixon, Lloyd "Average Current Mode Control of Switching Power Supplies." Unitrode Application Note. Unitrode Corporation 7 Continental Blvd., Merrimack, NH 03054. 1990 pp. 3-369 thru 3-356. U-140.

(Continued)

*Primary Examiner* — Adolf Berhane
*Assistant Examiner* — Gary Nash
(74) *Attorney, Agent, or Firm* — Gary Stanford (57) ABSTRACT

A controller and controlling method is disclosed for a boost converter. The controller includes a first node for receiving an output sense signal indicative of an output DC voltage, a second node for receiving a boost current sense signal indicative of current through an inductor of the boost converter, a first combiner which provides an error signal based on a difference between the output sense signal and a reference signal, an integrator which integrates the error signal and which provides a compensation signal indicative thereof, and a pulse controller which provides a pulse control signal for controlling the power switch to operate the boost converter in DCM. The pulse controller develops pulse control signal based on comparing the compensation signal with a ramp signal and further adjusts the pulse control signal over a cycle of a rectified AC input voltage based on the boost current sense signal.

17 Claims, 6 Drawing Sheets

(56) References Cited

OTHER PUBLICATIONS

Athab, H.S. "Control Strategy for Discontinuous Conduction Mode Boost Rectifier with Low Total Harmonic Distortion and Improved Dynamic Response." American J. of Engineering and Applied Sciences 1 (4): 329-337, 2008. ISSN 1941-7020 © 2008 Science Publications pp. 329-337.

Gu, Linlin et al. "Means of Eliminating Electrolytic Capacitor in AC/DC Power Supplies for LED Lightings" IEEE Transactions on Power Electronics, vol. 24, No. 5, May 2009. pp. 1399-1408.

Brown, R. et al. "PFC Converter Design with IR1150 One Cycle Control IC" Application Note AN-1077. International Rectifier, pp. 1-18.

* cited by examiner

SYSTEM AND METHOD OF FEED FORWARD FOR BOOST CONVERTERS WITH IMPROVED POWER FACTOR AND REDUCED ENERGY STORAGE

CROSS-REFERENCE TO RELATED APPLICATIONS

This application claims the benefit of U.S. Provisional Application Ser. No. 61/569,013, filed on Dec. 9, 2011, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which.

DETAILED DESCRIPTION

The benefits, features, and advantages of the present invention will become better understood with regard to the following description, and accompanying drawings. The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Conventional techniques for achieving high power factor with a discontinuous current mode (DCM) boost converter either regulated the output at a high voltage or added control complexity. Regulating the output voltage above (approximately) twice the peak AC input voltage achieves high power factor and low input current distortion at the expense of high component stress. Several conventional approaches use feed forward techniques to vary the on-time of the switching device over the line cycle to improve the power factor with lower output voltages. However, most if not all of the conventional methods use precision multiply, divide, and/or square-root functions in the controller. Adding this complexity to the control reduces the initial appeal of the PFC boost operating in DCM.

Minimizing the boost output capacitor is desirable. Reducing the capacitance can lower the cost, reduce the size, and increase the operating life of the converter (allows longer life ceramic dielectric instead of electrolytic capacitors). However, reducing the boost output capacitance increases the output voltage ripple. This is because a boost converter programmed to provide high power factor delivers energy that varies with the AC input to the output capacitor. The high ripple voltage can distort the input current and degrade the power factor.

It would be desirable to provide a simple power factor control technique that does not require precision multiply, divide or square-root functions and operates at a moderate output voltage level with minimal output capacitance.

Disclosed herein is a simple control system and method for a boost switching converter that achieves high power factor and low harmonic distortion with minimal energy storage capacitance. The method injects a boost current signal into the control to vary the on-time of a switching device over the line cycle of the AC input.

Figure 1:
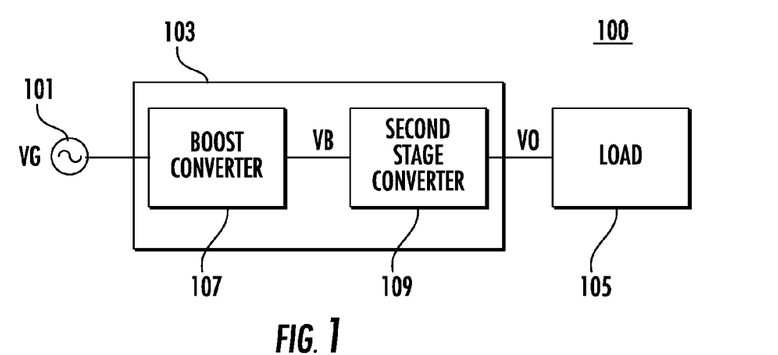
FIG. 1 is a simplified block diagram of a power conversion system including a front end boost converter implemented according to one embodiment.

FIG. 1 is a simplified block diagram of a power conversion system 100 including a front end boost converter 107 implemented according to one embodiment. An alternating current (AC) source 101 provides an input AC voltage VG to a voltage converter 103, which provides a regulated output voltage VO to a load 105. The converter 103 includes the boost converter 107 receiving VG and providing an output direct current (DC) voltage VB to a second stage converter 109. The present disclosure primarily concerns implementation of the boost converter 107. The second stage converter 109 converts VB to the lower voltage, regulated output voltage VO for providing power to the load 105.

Figure 2:
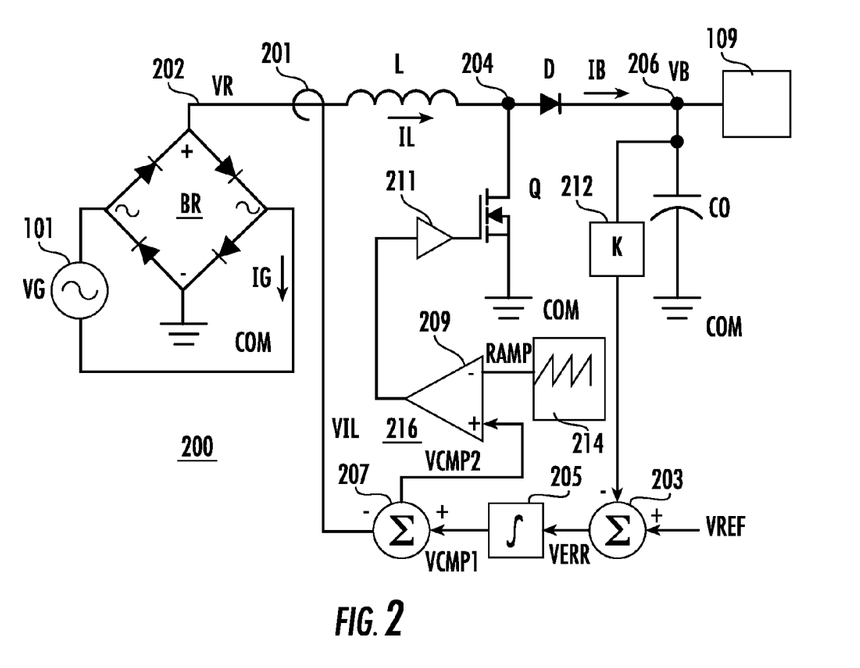
FIG. 2 is a simplified schematic and block diagram of a boost converter implemented according to one embodiment of the boost converter of FIG. 1.

FIG. 2 is a simplified schematic and block diagram of a boost converter 200 implemented according to one embodiment of the present invention which may be used as the boost converter 107 of FIG. 1. The AC source 101 provides positive and negative polarity signals of the AC voltage to corresponding input terminals of a full-wave bridge rectifier BR, which has a negative output terminal coupled to a common node (COM) and a positive output terminal coupled to a node 202 providing a rectified voltage VR. It is noted that COM represents a common or reference node with any suitable positive, negative or ground voltage level. It is also noted that COM is shown in simplified form and may also represent multiple reference nodes in a given implementation, such as, for example, multiple ground levels, e.g., signal ground, power ground, chassis ground, etc. Node 202 is coupled to one end of an inductor L, having its other end coupled to a node 204 which is further coupled to the anode of a diode D and to the drain of a metal-oxide semiconductor, field-effect transistor (MOSFET) Q. It is understood that any other appropriate controlled switching device may be used to implement Q. The cathode of diode D is coupled to an output node 206 developing the voltage VB.

Output node 206 is further coupled to the input of the second stage converter 109, to one end of an output capacitor CO, and to a negative input terminal of a combiner or summing device 203 through a gain device 212 with gain K. The gain device 212 may be omitted when it is desired to sense the output voltage VB directly. The gain K is an arbitrary value depending upon the particular implementation and may have a value of less than one to reduce the voltage of the sensed voltage. In one embodiment, the gain device K may be a simple voltage divider such as including a pair of resistors coupled in series between node 206 and COM having an intermediate junction coupled to the negative input terminal of the summing device 203. The other end of the capacitor CO is coupled to COM, and the summing device 203 has a positive input terminal receiving a reference voltage VREF. VREF represents the target voltage level of VB, where the summing device 203 operates to subtract VO from VREF to develop an error voltage VERR. The output of the summing device 203 provides VERR to the input of an integrating device 205.

The integrating device 205 has an output providing an integrated error voltage VCMP1 (or compensation voltage) to the positive input of another combiner or summing device 207, which receives a voltage VIL at its negative input and which provides an adjusted compensation voltage VCMP2 at its output to the non-inverting (+) input of a comparator 209. A ramp voltage RAMP generated by a ramp generator 214 is provided to the inverting (−) input of the comparator 209, which has its output coupled to the input of a driver 211. The output of the driver 211 is coupled to the gate of the MOSFET 211. An input current IG flows through the voltage source 101 and bridge rectifier BR, a corresponding current IL flows through the inductor L and an output current IB flows through diode D to the output node 206. A current sensor 201 senses current IL and develops the voltage VIL based on IL. The summing device 207 subtracts VIL from VCMP1 to develop VCMP2. It is noted that the current IL is a rectified version of IG.

The summing device 207, the ramp generator 214 and the comparator 209 generally form a pulse controller 216 of the boost converter 200 for developing a pulse control signal provided to the driver 211 to control switching of Q. The pulse controller 216 develops the pulse signal based on the compensation voltage VCMP1 and VIL as described herein. In each of the configurations described herein, the inductor L, the switch Q, the diode D and the capacitor CO generally form a boost stage of the boost converter. The bridge rectifier BR and the inductor L, the switch Q, and the diode D are externally provided and the remaining components may be provided on a controller integrated circuit (IC) or chip.

In boost converter operation, the comparator 209 controls switching of Q based on a comparison of the voltage levels of VCMP2 and RAMP. In one embodiment, RAMP has a suitable frequency level in which it ramps up at a suitable rate and then resets low during each switching cycle. When RAMP resets low at the beginning of each switching cycle, it falls below VCMP2 turning on Q which causes IL to increase. When RAMP reaches or otherwise exceeds VCMP2, the comparator 209 turns Q off and the current IL through the inductor L flows through diode D to generate the output boost current IB.

A boost converter operating in discontinuous current mode (DCM) is attractive for providing high input power factor in low power applications. DCM generally means that the current through the inductor L goes to zero during each cycle of the frequency of operation. The primary appeal of the DCM boost converter is the simplicity of the control. Modulating the switching device Q with a constant on-time causes a peak inductor current to follow the rectified AC line voltage. However, the line current can become distorted if the output voltage is too low.

The reason for poor power factor with a DCM boost converter can be traced to the freewheeling inductor current. The input current, IG, averaged over a switching interval, is the summation of the average inductor current $I_{ON}$ during the on-time of Q, $t_{ON}$, and the average inductor freewheeling current, IB, or IG=$I_{ON}$+IB. The on-time current is according to the following equation (1):

$$I_{ON} = \frac{VG \cdot t_{ON}^2}{2 \cdot L \cdot T_{SW}} \tag{1}$$

where L is the inductance of inductor L and $T_{SW}$ is its switching period of RAMP. If $t_{ON}$ is constant, then $I_{ON}$ follows the input voltage. The average freewheeling current IB is also the average boost output current according to the following equation (2):

$$IB = \frac{VG \cdot t_{ON}^2}{2 \cdot L \cdot T_{SW} \cdot \left(\frac{VB}{VG} - 1\right)} \tag{2}$$

The average freewheeling current is a function of the boost output voltage. The input current distortion increases as the output voltage VB approaches the input voltage VG.

The boost converter 200 is configured to use the boost current as the feed forward signal to modify the on-time $t_{ON}$ of the switching device Q. VIL is a signal proportional to the boost current which is injected into the control loop. The average boost output voltage VB is regulated with an integrated error signal VCMP1 that is essentially constant over ½ line cycle (line cycle of the input voltage VG). The on-time $t_{ON}$ of Q is derived by subtracting (207) a scaled boost current signal VIL from the integrated error signal VCMP1 and comparing (209) the result VCMP2 with RAMP. The current feed-forward signal includes input and output voltage information as given by the equations (1) and (2). The on-time $t_{ON}$ is varied over the line cycle and is responsive to high output ripple voltage.

Figure 3:
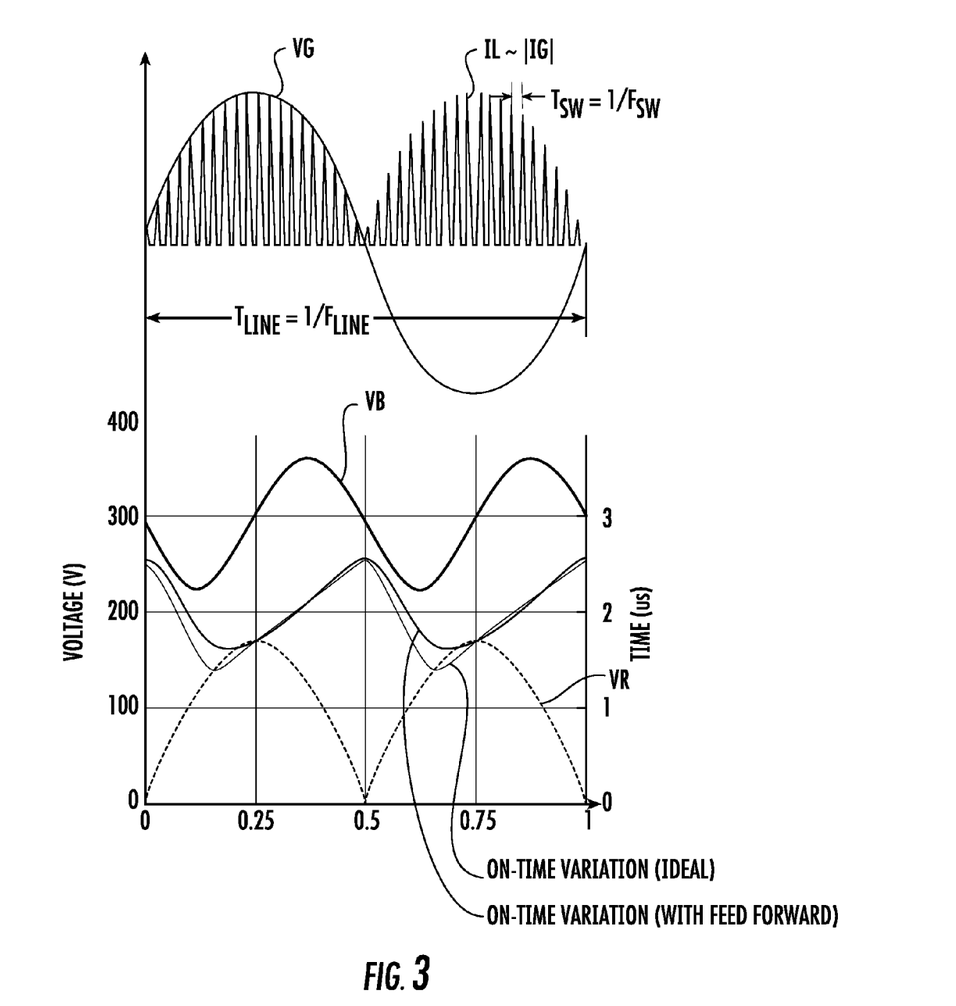
FIG. 3 is a timing diagram illustrating operation of the boost converter of FIG. 2.

FIG. 3 is a timing diagram illustrating operation of the boost converter 200. The voltage of signals VG, VB and VR (left-side vertical voltage scale) are plotted along with the variation of $t_{ON}$ on-time (right-side vertical time scale) for the ideal case and on-time variation with feed forward. The inductor current IL is also plotted and superimposed with VG, in which IL represents a rectified or absolute value version of IG. The input AC voltage VG has a frequency $F_{LINE}$ and period $T_{LINE}$ so that the timing diagram represents one line cycle (lower horizontal scale normalized time from 0 to 1) of VG. RAMP has a frequency $F_{SW}$ which is also the switching frequency of Q, in which $T_{SW}=1/F_{SW}$. The ideal on-time $t_{ON}$ is derived by equating the equations (1) and (2) for IG equal to a sine wave. Although the on-time with current feed-forward deviates from the ideal on-time, the boost converter 200 achieves relatively high power factor and low harmonic distortion.

The current feed forward loop may be implemented using simple, low-cost circuit techniques. Monitoring the boost current with the current sensor 201, however, implies an expensive current sensor that translates the small signal current floating on high voltage to control Q referenced to COM.

Figure 4:
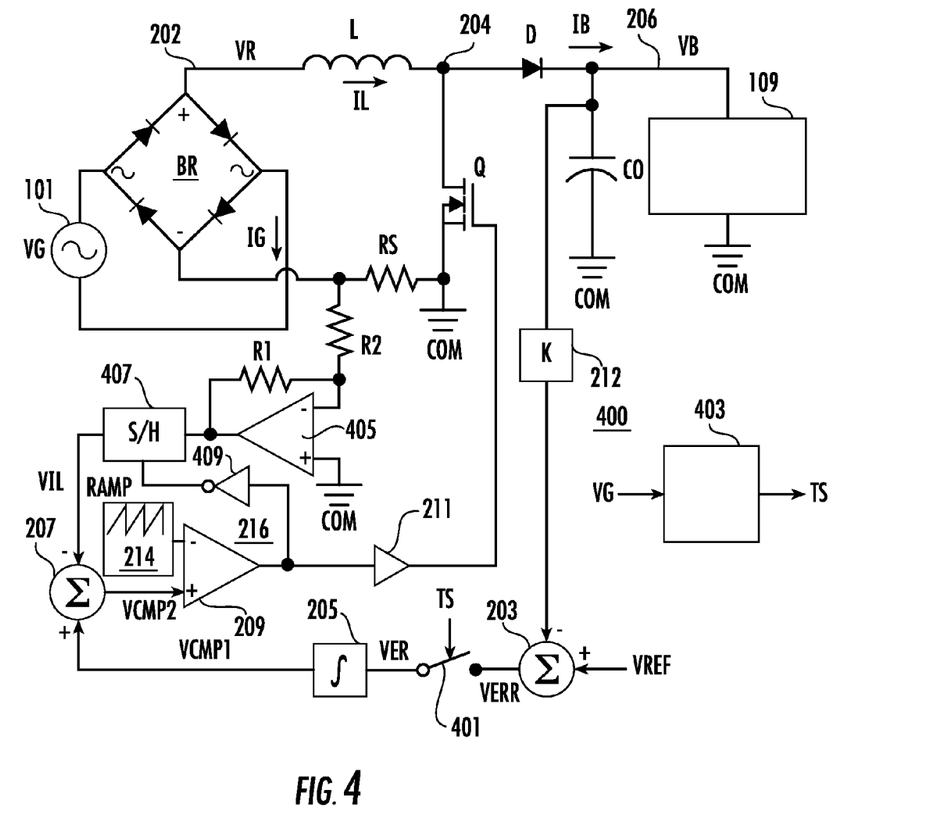
FIG. 4 is a simplified schematic and block diagram of a boost converter implemented according to another embodiment of the present invention using a current sensing circuit replacing a current sensor.

FIG. 4 is a simplified schematic and block diagram of a boost converter 400 implemented according to another embodiment of the present invention. The boost converter 400 is another embodiment of the boost converter 107, and is similar to the boost converter 200 in which similar components have identical reference numbers. The components BR, L, D, CO, Q, 203, 205, 207, 209, 211, 212, 214 and 216 are coupled to operate in similar manner. VB (via 212) and VREF are provided to respective inputs of the summing device 203 in similar manner, except that the output VERR is provided through a sample switch 401. Switch 401 is controlled by a sample signal TS generated by a sample device 403 providing a sampled error signal VER provided to the integrating device 205. In one embodiment, sample device 403 asserts a pulse on TS to close switch 401 upon zero-crossing of the input AC signal VG. The VCMP1 output of 205 is provided to the positive input of the summing device 207 in similar manner for providing VCMP2, which is provided to the non-inverting input of the comparator 209 in similar manner. The output of the comparator 209 is provided to the driver 211 for controlling switching of Q in similar manner.

In this case, the current sensor 201 is replaced by a current sensing circuit for developing the VIL signal provided to the negative input of the summing device 207. A sense resistor RS is coupled between the negative output terminal of the bridge rectifier BR and COMM. The negative output terminal of the bridge rectifier BR is further coupled to one end of a resistor R2, having its other end coupled to one end of a feedback resistor R1 and to the inverting input of an amplifier 405, having its non-inverting input coupled to COM. The output of the amplifier 405 is coupled to the other end of R1 and to an input of a sample and hold (S/H) device 407. The output of the comparator 209 is also coupled to the input of an inverter 409, having its output coupled to the control input of the S/H device 407. The output of the S/H device 407 provides VIL as a sampled version of the output of the amplifier 405.

In operation, the inductor IL also flows in the current sensing resistor RS. The negative voltage across RS is multiplied by the inverting gain (−R1/R2) of the amplifier 405 and sampled by sample device 407 during the entire freewheeling interval when Q is off, and VIL is the average of the sampled signal during the interval in which VIL is proportional to the boost output current, IB. Subtracting the sampled signal as a version of the output current signal from the integrated error signal VCMP1 to adjusted compensation signal VCMP2 yields similar feed-forward behavior as the technique of the boost converter 200 without having to use an expensive current sensor.

Figure 5:
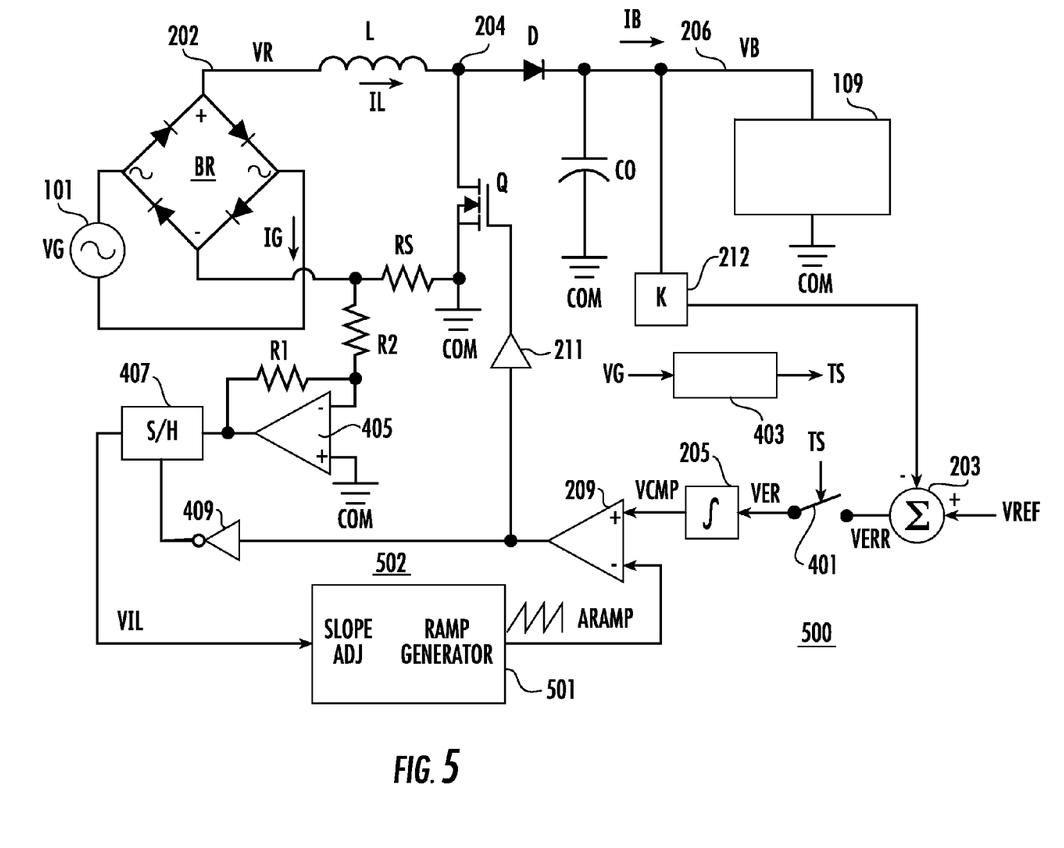
FIG. 5 is a simplified schematic and block diagram of a boost converter implemented according to another embodiment of the present invention in which the slope of a ramp control signal is adjusted.

FIG. 5 is a simplified schematic and block diagram of a boost converter 500 implemented according to another embodiment of the present invention. The boost converter 500 is another embodiment of the boost converter 107, and is similar to the boost converter 400 in which similar components have identical reference numbers. The components BR, L, D, CO, Q, 203, 205, 209, 211, 212, 401, 403, 405, 407 and 409 are coupled to operate in similar manner. In this case, the pulse controller 216 is replaced by a pulse controller 502 as further described herein. For the pulse controller 216, the summing device 207 is removed and the VCMP output of the integrating device 205 is not further adjusted but instead is provided to the non-inverting input of the comparator 209. The output of the comparator 209 is provided to the driver 211 or controlling switching of the switch Q and to the inverter 409 for controlling the S/H device 407. The amplifier sensing circuit (RS, R1, R2, 405) is provided to operate in similar manner to develop VIL. The pulse controller 502 includes a ramp generator 501 which replaces the ramp generator 214. In this case, VIL is instead provided to the slope adjust input of the ramp generator 501 which develops an adjusted ramp signal ARAMP provided to the inverting input of the comparator 209.

The boost converter 500 generates the boost-output-current signal and adjusts the slope of the ramp signal for the feed forward control. Both of the boost converters 400 and 500 illustrate a technique that samples and integrates the error VERR (which is the difference between boost output, VB and the reference VREF). Subtracting the output current signal from the integrated error signal as shown by the boost converter 400 yields similar feed-forward behavior as the boost converter 500 where the sampled output current is used to adjust the slope of the ramp control signal. Either technique reduces the size of the output capacitor CO and facilitates integration into a controller integrated circuit (IC).

Figure 6:
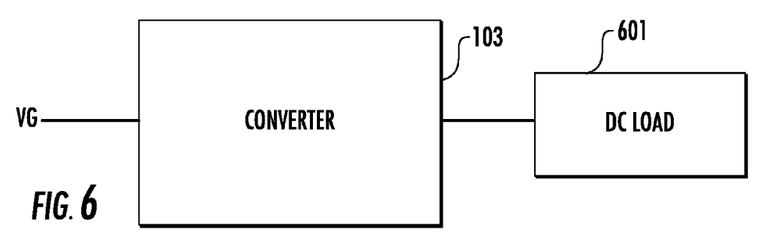
FIGS. 6-9 illustrate various electronic devices using the converter of FIG. 1 with a boost converter implemented according to any of the configurations described herein.
Figure 7:
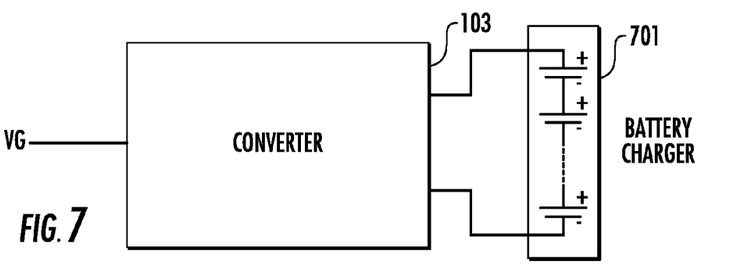
Figure 8:
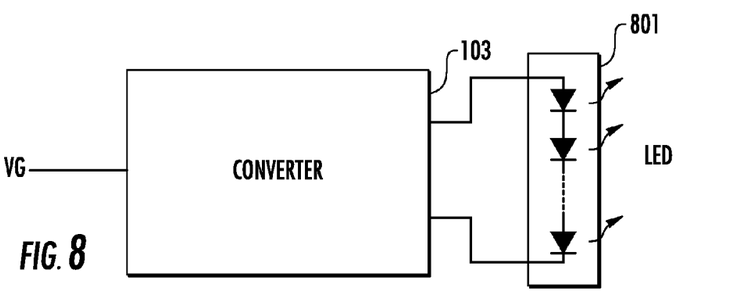
Figure 9:
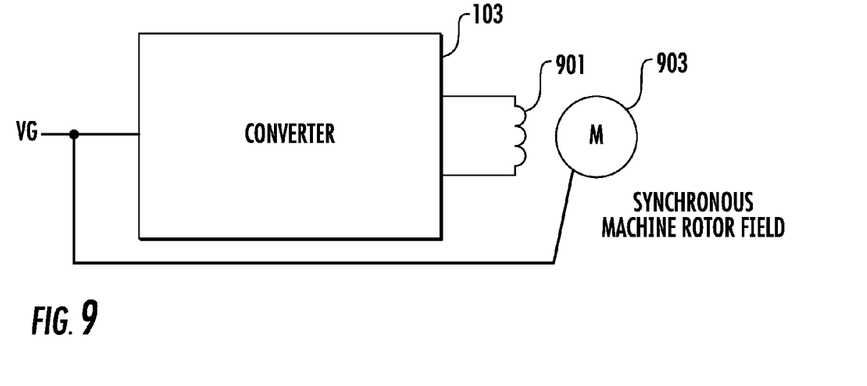

FIGS. 6-9 illustrate various electronic devices using the converter 103 with a boost converter implemented according to any of the configurations described herein. As shown in FIG. 6, the converter 103 receives VG and drives any type of DC load 601. As shown in FIG. 7, the converter 103 receives VG and charges a battery or battery bank 701 including one or more rechargeable batteries. As shown in FIG. 8, the converter 103 receives VG and provides current to one or more light-emitting diodes (LEDs) 801. As shown in FIG. 9, the converter 103 receives VG and provides current to a coil 901 or the like to generate a magnetic field for an electric motor 903 or the like.

Figure 10:
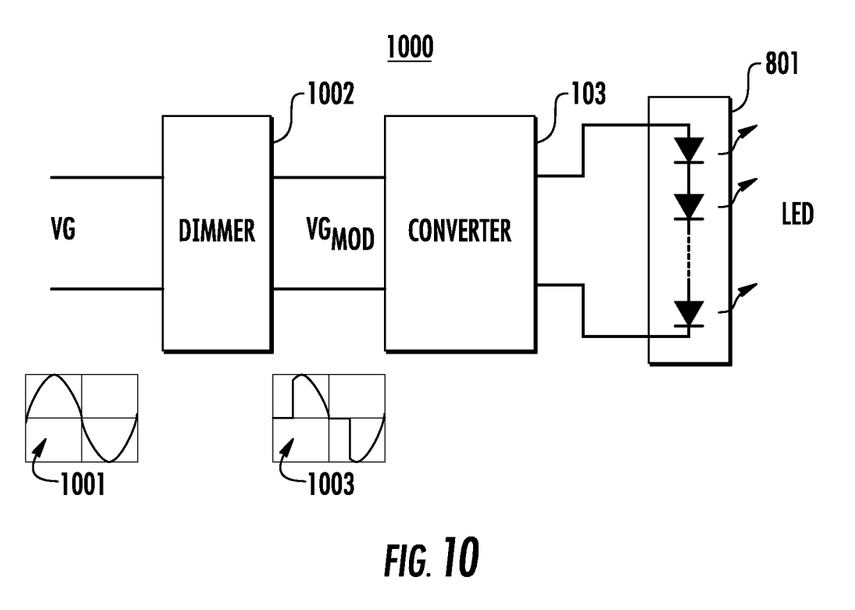
FIG. 10 is a block diagram of an electronic device including the converter of FIG. 1 configured in a similar manner as that shown in FIG. 8 for providing current to one or more LEDs.

FIG. 10 is a block diagram of an electronic device 1000 including the converter 103 configured in a similar manner as that shown in FIG. 8 for providing current to one or more LEDs 801. In this case, a conventional line dimmer 1002 receives VG (e.g., AC line voltage) and provides an AC conductive angle modulated voltage or "chopped" voltage $VG_{MOD}$, which is provided to the input of the converter 103. In one embodiment, the line dimmer circuit 1002 operates to selectively chop one or both of the leading edge and the trailing edge of VG, depicted at 1001, at any phase angle between 0 and 180 degrees for every half cycle (i.e., 180 degrees), to provide $VG_{MOD}$. An exemplary form of $VG_{MOD}$ is depicted at 1003 in which the leading edge is chopped during every half cycle. In one embodiment, the line dimmer circuit 1002 uses a TRIAC (not shown) or the like to delay the VAC wave shape near zero until the predetermined phase angle. The greater the dimmer phase angle, the more VG is chopped or zeroed to reduce the voltage of $VG_{MOD}$. Once the phase angle is reached per half cycle, VG steps up to the line voltage (e.g., the TRIAC conducts) and the remaining portion of VG is output to the converter 103.

The disclosed system and method achieves high power factor and low harmonic distortion with minimal energy storage capacitance and does not need precision multiply, divide, and/or square-root functions. Additionally, at least one disclosed embodiment samples and integrates the error signal making it suitable for silicon integration, unlike conventional configurations which use long time constants and big components making them less suited for silicon integration.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. A controller for a boost converter in which the boost converter includes an inductor, a power switch, a diode and an output capacitor coupled together to convert a rectified AC input voltage to an output DC voltage, the controller comprising:

a first node for receiving an output sense signal indicative of the output DC voltage;

a sense amplifier including an input receiving a first sense signal indicative of the rectified AC input voltage and including an output providing a second sense signal indicative thereof;

a sampler which samples said second sense signal based on said pulse control signal and which provides a boost current sense signal indicative thereof, wherein said sampler samples during a freewheeling interval of the boost converter and provides said boost current sense signal as an average of sampled values;

a first combiner which provides an error signal based on a difference between said output sense signal and a reference signal;

an integrator which integrates said error signal and which provides a compensation signal indicative thereof; and a pulse controller which provides a pulse control signal for controlling the power switch to operate the boost converter in discontinuous conduction mode, wherein said pulse controller develops said pulse control signal based on comparing said compensation signal with a ramp signal and further adjusts said pulse control signal over a cycle of the rectified AC input voltage based on said boost current sense signal.

2. The controller of claim 1, wherein said pulse controller comprises:

a second combiner which provides an adjusted compensation signal based on a difference between said compensation signal and said boost current sense signal;

a ramp generator which generates said ramp signal; and a comparator which compares said ramp signal with said adjusted compensation signal and which provides said pulse control signal indicative thereof.

3. The controller of claim 1, further comprising:

a sample switch interposed between said first combiner and said integrator and controlled by a pulse signal; and a sample device for providing a pulse on said pulse signal for each zero crossing of an AC input voltage.

4. An electronic device, comprising:

a rectifier which rectifies an input AC voltage to provide a rectified voltage;

a boost stage operative to convert said rectified voltage to an output DC voltage; and a controller, comprising:

a first input receiving an output sense signal indicative of said output DC voltage;

a sense resistor coupled to said rectifier providing a sense voltage;

a sense amplifier including an input receiving said sense voltage and including an output providing an amplified sense voltage indicative thereof;

a sampler which samples said amplified sense voltage based on said pulse control signal and which provides a boost current sense signal indicative thereof, wherein said sampler samples during a freewheeling interval of said boost stage and holds an average sampled value during a power interval of said boost stage;

a first combiner which provides an error signal based on a difference between said output sense signal and a reference signal;

an integrator which integrates said error signal and which provides a compensation signal indicative thereof; and a pulse controller which provides a pulse control signal for controlling said power switch to operate said boost stage in discontinuous conduction mode, wherein said pulse controller develops said pulse control signal based on comparing said compensation signal with a ramp signal and further adjusts said pulse control signal over a cycle of said input AC voltage based on said boost current sense signal.

5. The electronic device of claim 4, wherein said boost stage comprises:

an inductor including a first end receiving said rectified voltage and including a second end;

a power switch including current terminals coupled between said second end of said inductor and a common node and including a control terminal receiving a control signal based on said pulse control signal;

a diode having its anode coupled to said second end of said inductor and having a cathode coupled to an output node developing said output DC voltage; and a capacitor coupled between said output node and said common node.

6. The electronic device of claim 4, further comprising:

a second stage converter which converts said output DC voltage to a regulated DC voltage; and a DC load receiving said regulated DC voltage.

7. The electronic device of claim 6, wherein said DC load comprises at least one light emitting diode.

8. The electronic device of claim 6, further comprising a line dimmer which converts said input AC voltage to an AC conductive angle modulated voltage provided to said rectifier.

9. The electronic device of claim 4, wherein said pulse controller comprises:

a second combiner which provides an adjusted compensation signal based on a difference between said compensation signal and said boost current sense signal;

a ramp generator which generates said ramp signal; and a comparator which compares said ramp signal with said adjusted compensation signal and which provides said pulse control signal indicative thereof.

10. The electronic device of claim 7, further comprising:

a sample device which provides a pulse on a pulse signal for each zero crossing of said input AC voltage; and a sample switch interposed between said first combiner and said integrator which is controlled by said pulse signal.

11. A method of controlling a boost converter which converts a rectified AC input voltage to an output DC voltage, the method comprising:

providing an error signal based on a difference between the output DC voltage relative to a voltage reference level;

integrating said error signal and providing a compensation signal indicative thereof;

generating a ramp control signal;

providing a pulse control signal based on comparing the ramp control signal with the compensation signal for operating the boost converter in discontinuous conduction mode; and adjusting the pulse control signal over a cycle of the rectified AC input voltage based on a boost current sense signal indicative of current through an output inductor of the boost converter, wherein said adjusting the pulse control signal comprises subtracting the boost current sense signal from the compensation signal and providing an adjusted compensation signal which is compared with the ramp signal.

12. The method of claim 11, further comprising:

sensing the current through the output inductor and providing a current sense signal;

amplifying said current sense signal and providing an amplified sense signal; and sampling the amplified sense signal during a freewheeling interval of the boost converter for providing the boost current sense signal as an average of sampled values.

13. The method of claim 11, further comprising switching the error signal based on a frequency of the AC input voltage.

14. A controller for a boost converter in which the boost converter includes an inductor, a power switch, a diode and an output capacitor coupled together to convert a rectified AC input voltage to an output DC voltage, the controller comprising:
- a first node for receiving an output sense signal indicative of the output DC voltage;
- a second node for receiving a boost current sense signal indicative of current through the inductor;
- a first combiner which provides an error signal based on a difference between said output sense signal and a reference signal;
- an integrator which integrates said error signal and which provides a compensation signal indicative thereof; and
- a pulse controller which provides a pulse control signal for controlling the power switch to operate the boost converter in discontinuous conduction mode, wherein said pulse controller develops said pulse control signal based on comparing said compensation signal with a ramp signal and further adjusts said pulse control signal over a cycle of the rectified AC input voltage based on said boost current sense signal, wherein said pulse controller comprises:
  - a ramp generator that generates said ramp signal and that includes a slope adjust input receiving said boost current sense signal for adjusting a slope of said ramp signal; and
  - a comparator that compares said ramp signal with said compensation signal and that provides said pulse control signal indicative thereof.

15. The controller of claim 14, further comprising a current sensor for sensing said inductor current and providing said boost current sense signal indicative thereof.

16. An electronic device, comprising:
- a rectifier that rectifies an input AC voltage to provide a rectified voltage;
- a boost stage operative to convert said rectified voltage to an output DC voltage; and
- a controller, comprising:
  - a first input receiving an output sense signal indicative of said output DC voltage;
  - a second input receiving a boost current sense signal indicative of current through said boost stage;
  - a first combiner that provides an error signal based on a difference between said output sense signal and a reference signal;
  - an integrator that integrates said error signal and that provides a compensation signal indicative thereof; and
  - a pulse controller that provides a pulse control signal for controlling said power switch to operate said boost stage in discontinuous conduction mode, wherein said pulse controller develops said pulse control signal based on comparing said compensation signal with a ramp signal and further adjusts said pulse control signal over a cycle of said input AC voltage based on said boost current sense signal, wherein said pulse controller comprises:
    - a ramp generator that generates said ramp signal and that includes a slope adjust input receiving said boost current sense signal for adjusting a slope of said ramp signal; and
    - a comparator that compares said ramp signal with said compensation signal and that provides said pulse control signal indicative thereof.

17. A method of controlling a boost converter which converts a rectified AC input voltage to an output DC voltage, the method comprising:
- providing an error signal based on a difference between the output DC voltage relative to a voltage reference level;
- integrating said error signal and providing a compensation signal indicative thereof;
- generating a ramp control signal;
- providing a pulse control signal based on comparing the ramp control signal with the compensation signal for operating the boost converter in discontinuous conduction mode; and
- adjusting the pulse control signal over a cycle of the rectified AC input voltage based on a boost current sense signal indicative of current through an output inductor of the boost converter, wherein said adjusting the pulse control signal comprises adjusting the slope of the ramp signal using the boost current sense signal.

* * * * *